United States Patent Office 3,108,987
Patented Oct. 29, 1963

3,108,987
METHOD OF PREPARING RESIN AND
PRODUCT THEREOF
Joseph R. Galli, George I. Wheeler, and Robert B. Johnson, Wichita, Kans., assignors to Boeing Airplane Company, Wichita, Kans.
No Drawing. Filed Jan. 29, 1958, Ser. No. 711,798
17 Claims. (Cl. 260—45.4)

This invention relates to resin materials and methods for preparing such. In a more specific aspect, this invention relates to organic polyester polymers, cyanurate compound having a reactable halide, or mixtures of such acting either or both of the polyester and cyanurate compound with a trivalent or pentavalent phosphorus compound having a reactable halide, or mixture of such phosphorus compounds. More specifically the invention relates to polymerizable mixtures of a polyester polymer and a cyanurate compound with either or both of such having been reacted with a phosphorus compound as set forth hereinbefore, and the invention relates to a polymer or product produced by polymerizing the polymerizable mixture as described hereinbefore. In still another specific aspect, this invention relates to new plastic compositions and products, including co-polymers of polyester polymers and cyanurate compounds, at least one of which having been reacted prior to polymerization with a trivalent or pentavalent phosphorus compound having a reactable halide, such new plastic materials having valuable physical and chemical properties which make them especially useful in applications wherein resistance to temperatures in excess of 475 degrees F., is desirable, and wherein the new resins or polymerizable materials have particularly good usefulness in plastic material producing operations and procedures including laminating, casting, molding, coating, adhesion, etc. Yet a more specific aspect of this invention relates to new plastic or polymer articles of manufacture which are resistant to high temperatures and which are resistant to attack by moisture or other harmful agents, such when a laminate being particularly suitably used for radomes, and the like, for high speed jet aircraft, guided missiles, etc.

This is a continuation-in-part of our copending application for patent titled Method of Preparing Resin and Product thereof, Serial No. 600,700, filed July 30, 1956, now abandoned.

In yet a more specific aspect, this invention relates to reactable compositions of matter and the products resulting from reacting the materials of the compositions of matter, such reactable compositions of matter preferably including a polymerizable organic compound of the structural formula (1) 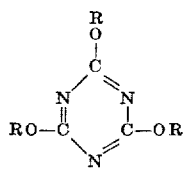

Compounds of the Formula 1 have the generic name trialkenyl cyanurates where R represents the hydrocarbon radicals allyl, butenyl, pentenyl, hexenyl, heptenyl, octenyl, nonenyl, etc., both straight chain and branch chain compounds. Relative to compounds to be employed in the new methods and compositions of matter of this invention, R preferably can be represented by the general structural formula

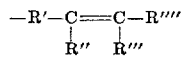

where R′ is an alkyl group or radical, and R″, R‴, and R‴′ are hydrogen or an alkyl group, preferably such that the sum of the carbon atoms in the groups or radicals R′, R″, R‴, and R‴′ does not exceed 18. Further, still more specifically, this invention relates to compounds to be used in the compositions of matter and methods of the invention wherein one or more of the R radicals or groups in the structural Formula 1 preferably is a group or radical having multiple unsaturation, for example, pentadienyl, heptadienyl, octadienyl, hexatrienyl, etc. It has been found that the invention can be practiced using compounds where up to two of the R groups can be saturated, such as with halogens added to the carbon atoms of double bonds, preferably chlorine or bromine, silyls, etc., if desired.

In still another specific aspect, this invention relates to polymerizable cyanurate compounds having the structural formula (2) 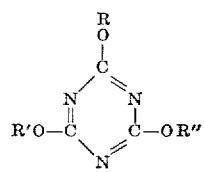

wherein R preferably represents an unsaturated group or radical of the class or type as set forth hereinbefore in relation to structural Formula 1, and R′ and R″ in Formula 2 represent saturated alkyl groups or radicals, preferably having carbon atoms in the range of from 1 to 9, or unsaturated alkenyl groups or radicals, the same or different than R, or such alkenyl groups which have been saturated with such as hydrogen, halogens, silyls, etc.

In a still more specific aspect, the new reactable compositions of matter of the invention preferably can include a polyester polymer which is preferably an unsaturated polyester polymer capable of copolymerizing with a cyanurate compound, preferably a cyanurate compound of the structural formula of (1) or (2), with the polyester polymer preferably being formed from a polyalcohol and a polyacid, and more preferably such a polyester having a molecular weight of from 500 to 1500.

More specifically, the new reactable compositions of matter of the invention include as a reactant a phosphorus compound, preferably a trivalent phosphorus compound having a reactable halide, or a pentavalent phosphorus compound having a reactable halide, or mixtures of two or more such compounds. The reactable compositions of matter of the invention can contain either or both of a cyanurate compound and a polyester polymer along with the phosphorus compound or compounds.

As stated hereinbefore, the invention specifically relates to the product resulting from the reaction between the phosphorus compound and the polyester polymer and/or the cyanurate compound, such reaction resulting in a recoverable copolymerizable composition when both the polyester polymer and cyanurate compound are present. The reaction results in a polymerizable product when only one of the cyanurate compound and polyester polymer are present, the other polymerizable material which is not present during the reaction being mixed with such reaction product to result in a copolymerizable composition, and in this instance, the reaction product is preferably recovered from the composition of matter after reaction prior to mixing with the other polymerizable material, however, such other polymerizable material can be added to the composition resulting from the reaction and leaving the reaction product mixed therewith.

Yet more specifically, this invention relates to the plastic product or polymer prepared by polymerizing the copolymerizable composition of matter resulting from the reaction discussed hereinbefore and/or prepared with the result of the reaction discussed hereinbefore.

In yet a more specific aspect, this invention relates to the copolymerizable masses set forth hereinbefore, and including an initiator to effect polymerization, preferably an organic peroxide initiator. Also, this invention relates to such polymerizable masses and including an inert filler material. Further, the invention relates to such polymerizable masses and a solvent for one or more of the polymerizable constituent, and to an insoluble liquid and emulsifying agent. The invention specifically relates to polymerization of such polymerizable masses by the so-called bulk, solvent and emulsion polymerization methods.

Manufacturers have long needed plastic materials which can be used and which will maintain their strength at high temperatures. For example, aircraft manufacturers have need for resins to fabricate such as radar windows and other structural parts, such parts being able to stand the temperatures resulting and occurring in the operation of high speed aircraft and guided missiles. These needed organic resins and materials must resist degradation and loss of strength when subjected to high temperatures resulting from aerodynamic heating or proximity to hot propulsive units such as jet-type engines. The new organic materials of our invention and the structural parts made therefrom greatly resist high temperatures to retain desired physical properties and are far superior to those known in the prior art, and it has been found that the structural parts fabricated from the new resin materials of our invention have high strength and very good radio frequency transparency at high temperature. The new plastic or polymer products of our invention made from the new resin materials of our invention according to the new methods of our invention have been found satisfactory in operation at temperatures within the range of minus 80 degrees C. to plus 290 degrees C., the common extremes of terrestrial temperature, aerodynamic heating, and heat from propulsive units. Also, these products have been found to operate successfully in atmospheric conditions varying in relative humidity from 0 to 100%. Unlike certain unsaturated polymers, for example cyanurate polymers, the new plastic products of our invention in use and under use conditions do not crack and craze on the surface. As a result, the new plastic products of our invention do not absorb water in extreme conditions of weather, thus maintaining desirable electrical properties, and they do not absorb oxygen from the air to result in rapid deterioration and oxidation to lose strength. Polyester-triallyl cyanurate resins are known and have some fairly good abilities to withstand surface temperatures when formed into a structural part in the range of from 225 degrees C. to 290 degrees C. Their chief advantage is that they do retain strength fairly well. However, these polyester-triallyl cyanurate resins, that is, the structural parts therefrom, are known to have certain undesirable weaknesses. In particular, during processing to form structural parts, they are subject to surface cracking and crazing during late stages of the usual cure. This cracking and crazing consists of many and varied, very fine but rather deep, interconnected cracks in the surface, such reducing the strength of the part and increasing its water absorption and oxygen adsorption. When the part absorbs water from this cracked and crazed condition, the radio frequency transparency of the usual reinforced part is severely adversely affected. Further, the cracked and crazed surface condition results in oxygen adsorption from the air which in turn results in rapid oxidation of the plastic materials, etc., to result in rapid deterioration. Structural parts made from the new resins of our invention are not subject to this cracking and crazing during cure, resulting in a part of longlife with high strength and radiofrequency transparency.

We have invented a new method of making new polymerizable resin materials and structural parts and/or articles of manufacture produced from the new polymerizable resin materials. In carrying on our invention we provide a polymerizable cyanurate compound and a polyester polymer capable of copolymerizing with the cyanurate compound. As a reaction step in the new process of our invention we react one or both of the cyanurate compound and polyester polymer with a compound of trivalent phosphorus having a reactable halide or a compound of pentavalent phosphorus having a reactable halide or with a mixture of such phosphorus compounds. A polymerizable compound or material results from this reaction. If only one of the cyanurate and polyester polymer is reacted, the unreacted one is mixed with the polymerizable material resulting from the reaction. This produces a polymerizable mass or composition of matter which is desirably used to produce the plastic products or polymer of our invention. We have found that in carrying on the process of our invention the reaction or reactions can take place within the mixture of cyanurate compound, the polyester polymer, and the phosphorus compound or compounds. From actually carrying on the new process of our invention, we know that a reaction or reactions take place between the phosphorus compound and the polyester polymer and cyanurate compound. We know that one or both of the polyester polymer and cyanurate compound are chemically altered. However, we do not known what reaction or reactions take place, nor what the product or products are resulting from the reaction or reactions. The polymerizable mass resulting from the reaction or reactions when polymerized to produce a plastic product results in more reproducible polymerized products with less shrinkage and less change in surface properties, particularly during late stages of cure, than with known so-called high temperature resistant plastics of the prior art, particularly the known polyester-triallyl cyanurate resins. Virtually no crazing and cracking of the surface during cure is encountered with the new plastic products of our invention formed from the polymerizable mass of our invention according to the new method of our invention. In operation to produce plastic products from our polymerizable masses remarkably constant results occur in producing a large number of like or similar parts, as ascertained by the heats of polymerization during processing. From part to part the heat of polymerization varies only by a maximum of 5% from the average heat of polymerization for the large number of parts. This is to be contrasted with a figure of 60% encountered with polyester-triallyl cyanurate resins. The new resins of our invention which yield much more uniform and consistently reproducible polymers or parts are very useful in forming all types of parts where resistance to high temperatures is desirable, such parts being capable of withstanding temperatures of as high as 550 to 600 degrees F. for prolonged periods of time and temperatures of up to 700 to 750 degrees F. for shorter periods of time, without such plastic materials or products losing their desirable strength characteristics.

It is an object of this invention to provide new polymerizable materials and methods to produce such and polymers or products made therefrom. It is another object of this invention to provide new polymerizable masses or resins, methods to produce such, and new temperature resistant polymers produced therefrom.

Another object of this invention is to provide new polymerizable materials which can be used in the usual shop fabrication processes to produce plastic or polymer parts of superior heat resistance and radiofrequency transparency, more specifically such products or polymers capable of functioning for their structural purposes within the range of minus 80 degrees C. to plus 290 degrees C., the extreme of terrestrial temperature, aerodynamic heating, heat from propulsive units powering high speed aircraft and guided missiles, and such materials capable of standing and properly functioning under atmospheric conditions wherein the relative humidity might be from 0 to 100%.

A further object of this invention is to provide new plastic materials which can be polymerized and processed to make laminates by the usual low pressure procedures wherein the resin is applied to the reinforcing fabric, or the like, in a relatively non-viscous condition and subsequently jelled and the laminate cured, such resulting laminate having superior strength and retaining such strength at high temperatures and being free of cracks and craze after cure and in use.

Still another object of this invention is to provide new and improved polyester-triallyl cyanurate resins by modifying either or both of the polyester polymer and the triallyl cyanurate by reaction with a phosphorus compound having a reactable halide.

Other objects and advantages of the new methods, polymerizable masses and polymer products of our invention will become apparent to those skilled in the art upon reading this disclosure.

Further discussion and description of the new compositions of matter and methods of this invention is set forth in the following. This discussion and description is of preferred specific embodiments of our invention, and it is to be understood that such is not to unduly limit the scope of the invention.

The new process of our invention to prepare the new polymerizable resin masses of our invention is carried on by providing a polyester polymer and a cyanurate compound one or both of which is reacted with the phosphorus compound, either separately or with the polyester and cyanurate mixed together. The cyanurate compound can be a single one or a mixture of cyanurate compounds can be used, it or they being polymerizable cyanurate compounds, preferably unsaturated cyanurate esters. Most preferred for practicing our invention are the cyanurate compounds corresponding to Formulas 1 and 2 as set forth hereinbefore, with substitution to the cyanurate ring as set forth hereinbefore. In the following are specific cyanurate compounds which are preferably used in carrying on the invention, and it is to be understood that these specific compounds are set forth by way of illustration and not by way of limitation. It is to be noted that these most preferred cyanurate compounds all have in common that there is no hydrogen substitutions on a carbon atom in the cyanurate ring has at least two carbon atoms in the chain and at least single unsaturation, such as, alkenyl esters, for example, triallyl cyanurate, tri-methylallyl cyanurate, triethallyl cyanurate, tributenyl-2 cyanurate, tributenyl-3 cyanurate, tri(3-methyl) butenyl-3 cyanurate, tri(2-methyl) butenyl-3 cyanurate, tripentenyl-4 cyanurate, tri(3-methyl) pentenyl-2 cyanurate, tri(3-methyl, 2-ethyl) pentenyl-3 cyanurate, and the like; alkenyl esters where only two of the substituted groups on the ring have unsaturation, for example, methyl diallyl cyanurate, ethyl diallyl cyanurate, propyl diallyl cyanurate, butyl diallyl cyanurate, pentyl diallyl cyanurate, and the like; alkenyl esters where only one of the substituted groups on the ring has unsaturation, for example, dimethyl allyl cyanurate, diethyl allyl cyanurate, dipropyl allyl cyanurate, dibutyl allyl cyanurate, dipentyl allyl cyanurate, and the like; tri substituted compounds where each substituted group has double unsaturation, for example, tripentadienyl-2, 4 cyanurate, tri(3-methyl) pentadienyl-2, 4 cyanurate, and the like; triheptatrienyl 2,4,6 cyanurate, and the like; aromatic esters of cyanuric acid, for example, tristyrenyl cyanurate, tri(allyl benzyl) cyanurate, and the like; and mixtures thereof. The methods of Dudley as set forth in U.S. Patents Nos. 2,510,564 and 2,537,816 can conveniently be employed to produce the cyanurate compounds used in the practice of our invention, or the cyanurate compounds can be prepared by analogous procedures and/or modifications thereof. For the best results in the practice of our invention, it has been found desirable to refine and purify the cyanurate compounds made by such methods by such as distillation, recrystallization, etc., before the cyanurates are used in the invention procedures.

The polyester polymers which are employed in carrying on our invention are reacted with the phosphorus compounds either alone or in the presence of the cyanurate compound. These polyesters are unsaturated and capable of polymerizing with the cyanurate compounds, preferably linear formed polyester polymers made from a polyalcohol and a polyacid by reacting them, with either or both of the polyalcohol and polyacid being unsaturated. By way of illustration and not limitation, the following polyalcohols, polyacids and polyesters are set forth as desirable ones to be used in the preparation of the polyester polymers which can be employed in our invention, polyalcohols such as the polyhydric alcohols ethylene glycol, propylene glycol, butylene glycol, pentylene glycol, 2,5 - dimethyl 3 hexyne - 2,5 - diol, 3,6-dimethyl, 4 octyne-3, 6-diol, 2-butene-1, 4 diol, and the like, and mixtures thereof, polyacids such as the polycarboxylic acids phthalic acid, maleic acid, fumaric acid, succinic acid, adipic acid, and the like, and mixtures of such polyacids. Specific preferred unsaturated polyesters capable of polymerizing with the cyanurate compounds are, for example, the ethylenically unsaturated polyesters polyethylene glycol maleate, polyethylene glycol fumarate, polypropylene glycol maleate, polypropylene glycol fumarate, diethylene glycol maleate phthalate, polyneopentyl glycol fumarate, diethylene glycol fumarate maleate, polypropylene glycol maleate, polypropylene glycol maleate phthalate, polypropylene glycol fumarate phthalate, and the like, and mixtures of such polyester polymers. These and other unsaturated polymerizable polyester polymers which can be used in carrying on our invention can conveniently be prepared by the method of Kropa, Patent No. 2,510,503, or prepared by analogous methods, or prepared by suitably modifying such methods.

The phosphorus compound or compounds which are utilized in the practice of our invention to react with the cyanurate compound and/or polyester polymer are preferably compounds of tri or pentavalent phosphorus having a reactable halide, such phosphorus compounds normally and desirably having a reactable halide attached to the phosphorus atom in the compounds. We have found that the following specific compounds can conveniently be used and are preferred, and it is to be understood that these specific compounds are offered by way of illustration and not by way of limitation so that the scope of our invention is not to be unduly limited. These specific compounds are phosphorus trihalides, for example, phosphorus trichloride, phosphorus tribromide, phosphorus triiodide, and the like, and mixtures thereof; phosphorus oxyhalides, for example, phosphorus oxychloride, phosphorus oxybromide, and the like, and mixtures of such; mixed phosphorus oxyhalides, for example, $POBrCl_2$, $POBr_2Cl$, $POFCl_2$, and the like, and mixtures thereof; and mixtures of such phosphorus halides. We have found that phosphorus trichloride and phosphorus oxychloride give particularly good results.

Through practicing the new process of our invention, we have ascertained the preferred conditions under which to carry out the reaction between the phosphorus compound and the cyanurate compound and/or the polyester polymer to produce the new polymerizable resin mass or materials of our invention. In either the case where the phosphorus is reacted with one of the polymerizable materials, or where the reaction is carried on while the polymerizable materials are in the presence of each other, we have found that the reaction is preferably carried on at temperature within the range of 0 degrees C. to 200 degrees C., more preferably in the range of 75 degrees C. to 150 degrees C. With phosphorus trichloride, phosphorus oxychloride, phosphorus tribromide, and/or phosphorus oxybromide, we have found the most preferred reaction temperature to be within the range of 100 degrees C. to 120 degrees C. Phosphorus trichloride and phosphorus oxychloride are liquids at room temperature and atmospheric pressure and readily go into solution with either of the cyanurate compound and polyester polymer. In this connection we have found that polyester polymers up to a molecular weight of 12,000 can be utilized in the practice of our invention, with the high molecular weight polyester polymers being handled in a suitable solvent wherein the reaction is carried on, preferably an inert solvent. In some instances the cyanurate compound can act as a solvent for the polyester polymer, and vice versa. It is more preferred to employ a polyester polymer in the practice of our invention which has a molecular weight in the range from 500 to 1500, and extremely good results have been obtained using polyesters in the most preferred range of from 600 to 900 molecular weight. Reaction times for the reaction between the phosphorus compound and the cyanurate compound and/or polyester polymer are preferably in the range of from 20 minutes to 8 hours, more preferably in the range of from 30 minutes to 2 hours. We have determined the most preferred ratio of reactants, and it is preferred to use the phosphorus compound in an amount such that the phosphorus compound or compounds are present in an amount in the range of from 0.25 to 6 parts by weight, more preferred 0.5 to 2.5 parts by weight, per 100 parts by weight of the reactable cyanurate compound and/or polyester polymer. It has been our experience that very good polymerizable resin materials result from our invention when the cyanurate compound and polyester polymer are in the presence of each other when the reaction with the phosphorus compound is carried out, and such is a preferred way of carrying on our invention. Any suitable quantities of the cyanurate compound and polyester polymer can be used. We prefer to use, and have found such very advantageous, a mixture wherein the cyanurate compound constitutes from 40 to 60 weight percent of the total weight of the cyanurate compound and polyester polymer. If the cyanurate compound and the polyester polymer are in the presence of each other when the reaction with the phosphorus compound takes place, it is preferred to mix the cyanurate compound and the polyester prior to adding the phosphorus compound. The mixing of the cyanurate compound and polyester can usually and conveniently be accomplished by heating to the liquid state, if necessary, or if this is not feasible a suitable and preferably inert solvent can be employed to put the compounds into solution. The phosphorus compound is then added and the conditions set for the reaction. Agitation has been found desirable in almost all instances to properly carry on the reaction. Equivalent and substantially the same procedures have been found applicable in carrying on the process of our invention when the cyanurate compound or the polyester polymer are reacted alone with the phosphorus compound. In any event, the usual methods of distillation, filtering, centrifuging, precipitation, etc., have been found desirable to recover the polymerizable resin mass or materials from the reaction effluent or product. If a separate reaction or reactions are carried on between the phosphorus compounds and the cyanurate compounds and polyester polymers, it is desired to recover the resulting polymerizable material from the reaction effluent prior to mixing same with the other of the polymerizable materials to produce the polymerizable resin mass of our invention which is used to produce the plastic or polymer products of our invention.

In using the new polymerizable masses or resins of our invention to produce the new products or polymers of our invention, the resins or polymerizable masses can be polymerized by the usual and known methods of producing polymers and products containing or having polymers associated therewith. Polymerization can be carried on by the so-called bulk processes. In many instances, it is desired that the polymerization be carried out in the presence of a filler material, and inert filler materials are particularly desirable. In producing laminated polymeric structures, these inert filler materials have been found to produce particularly good products. They result in the product having toughness, good tensile strength, etc. Also, the polymerization is usually quite exothermic, and the inert filler has the advantage in such polymerization that heat of polymerization is absorbed by the filler material. Of course, the inert filler material should have a temperature resistance equal to or greater than the polymer product formed, in the proposed use to which it is to be put. In the following is set forth a number of specific examples of filler materials which have been found useful with the new polymerizable masses or resins of our invention to produce the new plastic products of our invention. These filler materials are suggested by of illustration and not by way of limitation, and it is to be understood that they are not to unduly limit the scope of our invention. The preferred filler materials are glass fiber, glass cloth, mica, asbestos, silica gel, charcoal, carbon black, china clay, sand, borax, powdered metals, beryllium oxide, magnesium oxide, aluminum oxide, silicon dioxide, zirconium oxide, barium oxide, lead oxide, lithium halides, sodium halides, potassium halides, rubidium halides, and mixtures thereof.

So-called solvent methods of polymerizataion can readily be employed to produce the new polymers or products of our invention from the new polymerizable masses or resins of our invention. Those skilled in the art will appreciate that the choice of the solvent for the solvent polymerization is dependent upon the particular resin mass produced and used. Also, it should be kept in mind that in many instances one of the copolymerizable materials of the resin mass will be soluble in the other polymerizable material. In addition, in regard to the selection of a solvent, one should consider the other materials present in the polymerizable mass before polymerization, for example, the inert filler, initiator, etc. The particular solvent for the so-called solvent polymerization processes can have a bearing on the physical properties of the final polymer or product produced. In general, the polymerizable masses of our invention have been found to be soluble in the lower molecular weight alcohols, ketones, normally liquid hydrocarbons, aromatic hydrocarbons, and chlorinated hydrocarbons. Specific examples of solvents which have been found applicable to one or more of the new polymerizable masses of our invention are listed in the following. They are illustrative only, and it is to be understood that they are not to limit the scope of the invention unduly. Specific preferred solvents are methanol, ethanol, propanol, iso-propanol, acetone, methyl ethyl ketone, diethyl ketone, hexane, heptane, octane, benzene, toluene, xylene, carbon tetrachloride, chloroform, trichloroethylene, dioxane, and the like, and mixtures thereof. In most instances it has been found desirable to use a solvent with a relatively low boiling point. In cases where the temperature of polymerization is above the boiling point of the solvent at atmospheric pressure, it is preferred to raise the pressures efficiently to maintain the solvent in liquid form so that polymerization is carried out in solution. The most preferred temperature range for solvent polymerization has been found to be from 75 degrees C. to 150 degrees C.

Emulsion polymerization processes can be employed in polymerizing the polymerizable masses or resins of our invention to produce the new polymers or plastic product of our invention. It is preferred to use water as the polymerization medium in these so-called emulsion polymerization processes. The emulsion polymerization is preferably carried on with shaking, rapid stirring, etc., of the materials being polymerized and those other materials present during the polymerization. As is the usual case, it is desirable to employ emulsifying agents, wetting agents, etc.

An initiator of polymerization is desirably used no matter the polymerization process employed in polymerizing the new polymerizable masses or resins of our invention, that is, either bulk, solvent, or emulsion polymerization. Organic peroxides have been found to be the most useful polymerization initiators and they are preferred in carrying on the new process of our invention. However, other initiator materials and systems can be used. Specific examples of initiators which can be employed are set forth hereinafter, and it is to be understood that they are illustrative only and are not to unduly limit the scope of the invention. Preferred initiators for the polymerization are, for example, organic peroxides, such as benzoyl peroxide, diheptanol peroxide, tertiary-buty perbenzoate, ditertiary butyl diperphthalate, tertiary-butyl perfumarate, ditertiary diperadipate, butyl dipersuccinate, 1-hydroxycyclohexyl hydroperoxide-1, tertiary amyl hydroperoxide, diacetyl peroxide, 1-acetyl benzoyl peroxide, ditertiarybutyl peroxide, 2,4-dichlorobenzoyl peroxide, cumene hydroperoxide, caprylyl peroxide, lauroyl peroxide, methyl ethyl ketone peroxide, hydroxyheptyl peroxide, dicumyl hydroperoxide, and the like, and mixtures thereof; hydrogen peroxide; benzoin plus ultraviolet radiataion; cobalt salts; stannic chloride; aluminum chloride; boron trifluoride; ionizing radiation; high voltage; and the like; and mixtures and combinations thereof. Concentrations of the mass type initiators can vary over wide limits. We have found it preferable to use from 0.1 to 10 parts by weight per 100 parts by weight of the polymerizable materials. More preferably we prefer an initiator concentration in the range from 0.5 to 2 parts by weight per 100 parts by weight by the polymerizable resin. It has been found satisfactory to use the initiators alone, or they can conveniently be carried or supported on an inert or active carrier material.

Those skilled in the art will appreciate that polymerization temperature is dependent both on the polymerizable resin or mass and the initiator used in carrying out the new method of our invention to produce the new products or polymers of our invention. Generally the polymerization is preferably carried out at a temperature in the range of 50 degrees to 250 degrees C. when the initiator is an organic peroxide or a mixture of organic peroxides. A more preferred temperature range for polymerization is 100 degrees C. to 150 degrees C. Lower polymerization temperatures can generally be used when the initiation of polymerization is brought about through the use of such as radiation, high voltage, metal salts, etc. In these instances polymerization temperatures in the range of from 0 degrees to 120 degrees C. are preferred, more preferably a temperature in the range of 10 degrees C. to 100 degrees C.

We have found that in using bulk and solvent polymerization processes to polymerize the new polymerizable resins or masses of our invention to produce the new polymers or plastic products of our invention, reaction times in the range of from 30 minutes to 1½ hours result in producing hard and tough polymers, and reaction time in this range is preferred. In regard to emulsion polymerization processes, we have found that the usual times employed in the typical emulsion polymerization procedures can successfully be used in polymerizing our new resin materials. Of course, as those skilled in the art know, the time allowed for the polymerization reaction can and does vary the physical properties of the polymer produced, and this is particularly true in emulsion polymerization processes.

Examples of the new process of our invention to produce the new compositions of matter and products of our invention are set forth in the following. These examples represent preferred specific embodiments of our invention, and it is to be understood that the temperatures, pressures, times, quantities, materials, procedures, etc., set forth are not to unduly limit the scope of our invention.

EXAMPLE I

|  | Parts by weight |
|---|---|
| Polyester-triallyl cyanurate resin base | 100 |
| Phosphorus trichloride | 1 |

These polyester-triallyl cyanurate resin bases are available commercially and can be purchased in mixed condition. Several of these resin bases were processed according to this example. They contained approximately 50% triallyl cyanurate with the other 50% being either polyethylene glycol maleate, polyethylene glycol fumarate, or diethylene glycol maleate phthalate. Also, the polyester, polyethylene glycol maleate dicyclopentadiene adduct was run.

The resin bases were mixed with the phosphorus trichloride at room temperature, the liquid phosphorus trichloride readily mixing with the resin bases. Upon mixing an exothermic reaction occurred. Following this reaction, heating of the resulting mixture was commenced under vacuum (1–2 mm. Hg) until 110 degrees C. had been reached, and this temperature was maintain until reaction was complete as described hereinafter. The time required to reach the 110 degrees C. reaction temperature depended on the quantities prepared. In the laboratory quantities were used of approximately 5 kg., approximately 90 minutes was taken to reach the 110 degrees C., and this temperature was maintained for 1 hour to complete the reaction. The mixture resulting from the reaction was cooled to 20 degrees C. The reaction resulted in 2 by-products, namely, cyanuric acid and alyl chloride. The colloidal cyanuric acid was removed after the cooling of the reaction product by centrifugation in some instances and by press filtering in others. It was determined that allyl chloride was formed during the reaction in approximately the amount equivalent to the chlorine added initially as phosphorus trichloride. This allyl chloride formed was removed during the heating under vacuum, such being caught and liquified in a Dry-Ice-acetone cold trap. It was considered that reaction was complete when at least 90% of the theoretical amount of allyl chloride had been thus removed. The molecular weight of the polyester polymers used in the example were approximately in the range of 750 to 1000. The polymerizable masses or resins resulting from the reactions were typical of the new products of our invention, and it is preferred that they be used free of the allyl chloride and cyanuric acid formed during the reaction.

EXAMPLE II

|  | Parts by weight |
|---|---|
| Triallyl cyanurate | 50 |
| Polyethylene glycol maleate | 50 |

These two materials were heated to 60 degrees C. and mixed. They mixed readily. The resulting mixture was cooled to room temperature.

The polyester polymer used had a molecular weight of approximately 750.

The mixture of the cyanurate and polyester was mixed with phosphorus oxychloride (1 part by weight). The same procedure was carried out as in Example I hereof to bring about the reaction of the phosphorus oxychloride with the cyanurate and/or polyester. The same results as Example I were obtained, a polymerizable mass or resin being produced.

EXAMPLE III

The resin or polymerizable masses produced by the procedures of Examples I and II hereof were processed to form a laminated structure according to the usual and common methods to produce radomes, and the like, and according to the well-known general practices employed with unsaturated polymerizable polyester resins. Addition polymerization initiators were added to portions of the polymerizable products of Examples I and II. These were dibenzoyl peroxide, paramenthane hydroperoxide, and alpha, alpha'-azodi-iso-butyronitrile, and they were added in an amount of approximately 2 parts by weight per 100 parts by weight of the resin. The resin and initiator were thoroughly mixed at room temperature. Shortly thereafter, they were used to laminate. Glass cloth was used as the inert filler or reinforcer, and the laminate was cured under the usual elevated temperatures, varying pressures being employed. The laminates produced have particularly fine physical characteristics, being especially applicable to the production of radomes and other structures requiring transmissivity of radio-frequency signals. These properties were far better than with the usual cyanurate-polyester resins, and the new polymer or plastic products, specifically the laminates, retain their good physical properties over a long period of time due to the low moisture absorption and oxygen adsorption. This is due to the fact that surface cracking and crazing were only very slight. In addition, a very good polymer product was formed by bulk polymerization procedures common to the art without employing a filler.

The following Table I sets forth experimental data, etc., in regard to the resin materials and products thereof of this example, such resin material being produced according to the procedures of Examples I and II and using triallyl cyanurate and polyethylene glycol maleate of molecular weight of approximately 750. The characteristics set forth in the table are typical of the materials and products with the modified polyester-triallyl cyanurate resins, with, of course, the principal exception that the viscosity of the resin mixture has a fairly wide range.

Table I

Uncured resin:
Viscosity (Brookfield), 25 degrees C.    375 poises.
Refractive index (sodium D), 25 degrees C. _____ 1.5160.
Density, 21.1 degrees C. _____ 1.25–1.30.
Appearance _____ Clear Amber.
Acid number [1] _____ 38.5.
Storage stability of catalyzed resin __ 1 week.
Cured unfilled resin: Barcol hardness ___ 72.
Glass fabric laminate, 14 ply 181–301:
Dielectric constant _____ 4.8.
Loss tangent _____ 0.0085.
Glass cloth laminates, void-free, 14 ply 181–301, post-cured 4 hours at 425° F.:
Barcol hardness _____ 78.
Flexural strength and modulus (p.s.i.) (catalyzed 1% paramenthone hydroperoxide): [2]

[1] Barrett Division of Allied Chemical and Dye Company Method.
[2] Initial modulus only, and all results average of 3 specimens.

|  | RT | | 400° F. | | 500° F. | | 600° F. | |
|---|---|---|---|---|---|---|---|---|
|  | Flex. str. | $E_t$ ($\times 10^6$) | Flex. str. | $E_t$ ($\times 10^6$) | Flex. str. | $E_t$ ($\times 10^6$) | Flex. str. | $E_t$ ($\times 10^6$) |
| Unaged | 65,500 | 3.02 |  |  |  |  |  |  |
| Aged ½ hr. at test temp | | | 28,000 | 2.70 | 19,300 | 2.17 |  |  |
| Aged 6.5 hr. at test temp | | | | | 26,900 | 2.10 | 21,000 | 1.94 |
| Aged 20.5 hr. at test temp | | | | | 43,600 | 2.47 | 19,700 | 1.89 |

Solvent resistance (catalyzed ½% 2-4-dichloro benzoyl peroxide, ½% tertiary butyl perbenzoate and ½% benzoin): [2]

|  | Flex. str. (p.s.i.) | $E_t$ (p.s.i.) | Weight change (percent) |
|---|---|---|---|
| Control | 67,100 | 3.46 |  |
| After 30 days, distilled water | 55,600 | 2.92 | −0.66 |
| After 24 hrs. diester lube | 66,500 | 3.34 | −0.09 |
| After 24 hrs. hydraulic oil | 69,700 | 3.44 | −0.19 |
| After 24 hrs. ehtylene glycol | 66,600 | 3.39 | −0.05 |
| After 24 hrs. propyl alcohol | 65,700 | 3.32 | −0.00 |

Very substantially the same results were obtained with phosphorus oxychloride and phosphorus trichloride. With phosphorus oxychloride a greater amount was used relative to the resin base.

EXAMPLE IV

Parts by weight
Polyester-triallyl cyanurate resin base _____ 100
Phosphorus trichloride _____ 2

In this example the resin base was 50% polyethylene glycol maleate and 50% triallyl cyanurate. The procedure of Example I was carried out. The polymerizable reaction product resulting from the increased amount of phosphorus trichloride was not noticeably superior in physical properties when polymerized to a plastic product than with the smaller amount of phosphorus trichloride used in Example I. Of course, too little phosphorus trichloride does not produce the desired results which can be obtained from our invention. The comparable bromide, iodide and fluoride compounds of phosphorus have yielded products with essentially the same good physical properties as experienced with the chloride compounds of phosphorus. The chloride compounds are preferred because of consideration such as cost, higher toxicity, and availability.

EXAMPLE V

The polymerizable mass or resin produced according to Examples I and II hereof was analyzed. The results indicate that substantially all of the phosphorus added to the reaction mixture in carrying on the process of our invention is present in the product. Also, examination and analysis have indicated that the phosphorus compound reacts with both the cyanurate and the polyester polymer. The actual compounds obtained have not been determined. Results indicate that the products obtained from the reaction with the phosphorus compound depend to some extent upon the simultaneous presence of both the cyanurate compound and the polyester polymer.

EXAMPLE VI

Parts by weight
Triallyl cyanurate _____ 67
Phosphorus trichloride _____ 8
Hydrochloric acid (concentrated) _____ 0.2

The hydrochloric acid was added to the triallyl cyanurate, followed by the addition of the phosphorus trichloride. The mixture was stirred during prepartion. The resulting mixture was heated to 60–65 degrees C. for 1 hour, then at 100–110 degrees C. for 1 hour. A vacuum (1–2 mm. Hg) was applied for 1 hour to the resulting mixture with the temperature being maintained at 110 degrees C. The resulting product of the reaction was cooled to room temperature and stored in a closed container to prevent hydrolysis.

EXAMPLE VII

Parts by weight
Reaction product (Example VI) _____ 5
Resin base _____ 100

The resin base was 50% polyethylene glycol maleate (molecular weight 750) and 50% triallyl cyanurate.

The materials set forth hereinbefore in this example were mixed and heated to 100 degrees C. followed by cooling to room temperature.

A laminate was prepared from the polymerizable mass or resin resulting. This was done by the usual procedures. The resulting laminate showed excellent heat resistance but more crazing was encountered than in the instance of the laminates prepared from the polymerizable mass or resin produced by the procedures of Example I.

This resin should find ready application in uses where moderate crazing and the resulting water absorption are not too critical but where high temperature resistance is desirable. From a production standpoint the resin produced by this Example VIII has an advantage over that

EXAMPLE VIII

| | Parts by weight |
|---|---|
| Polyethylene glycol maleate | 500 |
| Dioxane | 500 |
| Potassium carbonate | 50 |
| Phosphorus trichloride | 10 |

The dioxane and resin were throroughly mixed, and the potassium carbonate was added thereto while rapidly stirring to give thorough dispersion. The phosphorus trichloride was added, whereupon an exothermic reaction took place. When the exotherm began to subside, the mixture was heated under reflux conditions for 12 hours. The resulting reaction mixture was cooled to room temperature. The potassium carbonate and other precipitate was removed therefrom by filtration.

EXAMPLE IX

| | Parts by weight |
|---|---|
| Resulting resin mixture from Example VIII | 200 |
| Triallyl cyanurate | 100 |

These materials were thoroughly mixed, and the dioxane and unreacted phosphorus trichloride were removed by distillation under vacuum (1–2 mm. Hg). The distillation was stopped when a sharp increase in distillate temperature indicated that triallyl cyanurate had begun to distill.

A laminate was prepared from the resulting polymerizable mass or resin by the usual common procedures. The resulting laminate was substantially free of crazing. However, it was somewhat inferior to the other laminates prepared with respect to resistance to high temperature, for example, it was inferior to the laminate prepared from the resin produced by the procedure of Examples I and II hereof.

We have determined that this resin can be used where crazing and the accompanying water absorption cannot be tolerated, but where high temperature resistance is not especially desirable.

As will be evident to those skilled in the art, various modifications of this invention can be made, or followed in the light of this disclosure and discussion, without departing from the spirit or scope of this disclosure, or from the scope of the claims.

We claim:

1. A method of making new polymerizable materials comprising, mixing together (1) a compound of the structural formula

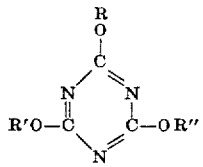

where R represents a radical selected from the group consisting of an aliphatic hydrocarbon radical having multiple ethylenic unsaturation and a radical having the structural formula

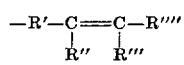

where in said last set forth formula R' is an alkyl radical and each R'', R''', and R'''' is a radical selected from the group consisting of hydrogen and an alkyl radical, and R' and R'' in said first set forth formula each represent a radical selected from the group consisting of an alkyl radical and a radical of the structure of said R set forth hereinbefore, (2) an ethylenically unsaturated polymerizable polyester polymer formed from reacting a polyhydric alcohol and an ethylenically unsaturated polycarboxylic acid and having a molecular weight of from 500 to 1500 and capable of copolymerizing with said compound of (1), and (3) an inoragnic compound of phosphorus selected from the group consisting of phosphorus trihalides, phosphorus oxyhalides, and mixtures thereof, and thereby producing as a reaction product a mixture of copolymerizable compounds and recovering said mixture of copolymerizable compounds.

2. The method of claim 1 wherein said reacting is carried on for a time of from 30 minutes to 2 hours, at a temperature in the range of 75–150 degrees C., with said compound of (1) constituting from 40 to 60 percent of the total by weight of said compounds of (1) and (2) present, and with said compound of (3) present in an amount in the range of from 0.25 to 6 parts by weight per 100 parts by weight of the total of said compounds of (1) and (2).

3. A method of making new polymerizable materials, comprising mixing together (1) a compound of the structural formula

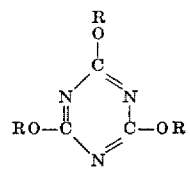

where each R represents an ethylenically unsaturated aliphatic hydrocarbon radical having from 3 to 18 carbon atoms, (2) an ethylenically unsaturated polymerizable polyester polymer formed from reacting a polyhydric alcohol and an ethylenically unsaturated polycarboxylic acid and having a molecular weight of from 500 to 1500 and capable of copolymerizing with said compound of (1), and (3) an inorganic compound of phosphorus selected from the group consisting of phosphorus trihalides, phosphorus oxyhalides, and mixtures thereof, and thereby producing as a reaction product copolymerizable materials, and recovering said copolymerizable materials as a mixture thereof by removing by-products of said reacting therefrom.

4. The method of claim 3 wherein said reacting is carried on for a time of from 30 minutes to 2 hours, at a temperature in the range of 75 to 150 degrees C., with said compound of (1) constituting from 40 to 60 percent of the total by weight of said compounds of (1) and (2) present, and with said compound of (3) present in an amount in the range of from 0.5 to 2.5 parts by weight per 100 parts by weight of said total of said compounds of (1) and (2).

5. The method of claim 4 wherein said compound of phosphorus is $PCl_3$.

6. A method of making new polymerizable materials comprising, mixing together an alkenyl cyanurate compound, an ethylenically unsaturated polymerizable polyester polymer formed by reacting a polyhydric alcohol and an ethylenically unsaturated polycarboxylic acid and capable of copolymerizing with said cyanurate compound, and an inorganic phosporus compound selected from the group consisting of phosphorus trihalides, phosphorus oxyhalides, and mixtures thereof, and thereby producing as a reaction product copolymerizable materials.

7. The method of claim 4 wherein said compound of (1) is triallyl cyanurate, said compound of (2) is polyethylene glycol maleate having a molecular weight of from 600 to 900, and said compound of (3) is $PCl_3$.

8. The product obtained by the method of claim 7.

9. A method of making new polymerizable materials comprising, mixing together triallyl cyanurate, polyethylene glycol maleate having a molecular weight of from 600 to 900, and $PCl_3$, thereby producing as a reaction product a copolymerizable mixture.

10. The method of claim 9 wherein said reacting is carried on at a temperature in the range of 100–120 degrees C. for a time of from 30 minutes to 2 hours, with said triallyl cyanurate constituting from 40 to 60 percent of the total by weight of same and said polyethylene glycol maleate, and with said $PCl_3$ present in an amount in the range of from 0.5 to 2.5 parts by weight per 100 parts by weight of said total of said triallyl cyanurate and polyethylene glycol maleate.

11. A method of making new polymerizable materials comprising, mixing together triallyl cyanurate, polyethylene glycol maleate having a molecular weight of from 600 to 900, and $POCl_3$, and thereby producing as a reaction product a copolymerizable mixture.

12. The product obtained by the method of claim 10.

13. A method of making new polymerizable materials comprising, mixing together triallyl cyanurate and polyethylene glycol maleate dicyclopentadiene adduct with said cyanurate constituting from 40 to 60 percent by weight of the resulting mixture, adding $PCl_3$ to the resulting mixture in an amount in the range of from 0.5 to 2.5 parts by weight per 100 parts by weight of said resulting mixture, maintaining the resulting mixture for a time of from 30 minutes to 2 hours at a temperature in the range of 100 to 120 degrees C., and thereby producing as a reaction product a mixture of copolymerizable compounds.

14. The product obtained by the process of claim 13.

15. The method of claim 1 wherein compounds (1) and (3) are reacted prior to the addition of compound (2).

16. The method of claim 3 wherein compounds (1) and (3) are reacted prior to the addition of compound (2).

17. The method of claim 6 wherein said cyanurate compound and said phosphorus compound are reacted prior to the addition of said polyester polymer.

References Cited in the file of this patent

UNITED STATES PATENTS

| | | |
|---|---|---|
| 2,437,046 | Rothrock et al. | Mar. 2, 1948 |
| 2,714,100 | Toy et al. | July 26, 1955 |
| 2,819,247 | Lundberg | Jan. 7, 1958 |
| 2,824,085 | Cummings | Feb. 18, 1958 |

OTHER REFERENCES

"Heat Resistant Copolymer of Trialkyl Cyanurate and Maleic Alkyd," by Elliott; Modern Plastics; pages 113, 114, 185, 186, 187, July 1952.

UNITED STATES PATENT OFFICE
CERTIFICATE OF CORRECTION

Patent No. 3,108,987                          October 29, 1963

Joseph R. Galli et al.

It is hereby certified that error appears in the above numbered patent requiring correction and that the said Letters Patent should read as corrected below.

Column 1, line 13, beginning with "compound" strike out all to and including "acting" in line 14, same column 1, and insert instead -- compounds and the reaction products resulting from reacting --; line 16, for "mixture" read -- mixtures --; column 5, line 43, after "hydrogen" insert -- substituted on a carbon atom in the cyanurate ring and that at least one of the --; column 8, line 15, after "by" insert -- way --; line 25, for "polymerizataion" read -- polymerization --; column 9, line 12, for "tertiary-buty" read -- tertiary-butyl --; line 21, for "radiataion" read -- radiation --; column 11, in the table at the bottom of the column, first column, line 5 thereof, for "ehtylene" read -- ethylene --; column 12, line 75, for "VIII" read -- VII --; column 14, line 2, for "inoragnic" read -- inorganic --; line 18, after "comprising" insert a comma.

Signed and sealed this 16th day of June 1964.

(SEAL)
Attest:

ERNEST W. SWIDER                          EDWARD J. BRENNER
Attesting Officer                       Commissioner of Patents